US006356919B1

(12) United States Patent
Shah et al.

(10) Patent No.: US 6,356,919 B1
(45) **Date of Patent: *Mar. 12, 2002**

(54) METHOD AND APPARATUS FOR REDUNDANT POSTAGE ACCOUNTING DATA FILES

(75) Inventors: Chandrakant J. Shah, Stockton; Keith B. Robertson, Castro Valley, both of CA (US)

(73) Assignee: Neopost Inc., Hayward, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/225,195

(22) Filed: Jan. 5, 1999

Related U.S. Application Data

(63) Continuation of application No. 08/562,143, filed on Nov. 22, 1995, now Pat. No. 5,918,234.

(51) Int. Cl.[7] .......... G06F 17/30

(52) U.S. Cl. .......... 707/204; 707/200; 707/3; 707/10; 705/404; 705/403; 714/4; 714/15; 714/20

(58) Field of Search .......... 707/100, 204; 705/410, 403; 380/23, 24, 25

(56) References Cited

U.S. PATENT DOCUMENTS

| | | | | |
|---|---|---|---|---|
| 3,652,795 | A | 3/1972 | Wolf et al. | 379/91.01 |
| 3,792,446 | A | 2/1974 | McFiggins et al. | 364/464.13 |
| 3,890,599 | A | 6/1975 | Simjian | 340/825.34 |
| 3,938,095 | A | 2/1976 | Check, Jr. et al. | 364/464.12 |
| 3,978,457 | A | 8/1976 | Check, Jr. et al. | 194/4 R |
| 3,990,558 | A | 11/1976 | Ehrat | 340/172.5 |
| 4,097,923 | A | 6/1978 | Eckert, Jr. et al. | 364/900 |
| 4,122,532 | A | 10/1978 | Dlugos et al. | 364/900 |
| 4,168,533 | A | 9/1979 | Schwartz | 364/900 |
| 4,252,537 | A | 2/1981 | Cattran et al. | 23/230 |
| 4,253,158 | A | 2/1981 | McFiggans et al. | 364/900 |
| 4,319,328 | A | 3/1982 | Eggert | 364/466 |
| 4,328,564 | A | 5/1982 | Pryor | 365/130 |
| 4,376,299 | A | 3/1983 | Rivest | 364/464 |
| 4,447,890 | A | 5/1984 | Duwel et al. | 364/900 |
| 4,547,853 | A | 10/1985 | Eckert | 364/464 |
| 4,569,022 | A | 2/1986 | Coppola et al. | 364/466 |
| 4,574,352 | A | 3/1986 | Coppola et al. | 364/466 |
| 4,629,871 | A | 12/1986 | Scribner et al. | 235/375 |
| 4,725,718 | A | 2/1988 | Sansone et al. | 235/495 |
| 4,743,747 | A | 5/1988 | Fougere et al. | 235/494 |
| 4,757,537 | A | 7/1988 | Edelmann et al. | 380/51 |

(List continued on next page.)

OTHER PUBLICATIONS

Brochure entitled "RPS Multicodebar Code Label Guide," RPS Roadway package System, Draft of May 1995, Revision 2, pp. 41–42.

AIM USA Technical Specification entitled "Data Matrix," AIM USA Technology Group, Pittsburgh, PA, Draft of May 18, 1995, 89 pp.

*Primary Examiner*—Jean M. Corrielus
(74) *Attorney, Agent, or Firm*—Townsend and Townsend and Crew LLP

(57) ABSTRACT

Apparatus and method for the maintenance of redundant postage accounting datafiles. Redundant postage accounting report data is maintained by the present invention by first creating a datafile on a postage metering device (e.g., an SMD) to store postage accounting data. A second datafile is created on a computer capable of communicating with the SMD (which may be either remote or local to the computer). For every transaction which updates the postage accounting data stored in the SMD, the datafile residing on the computer is updated to reflect the change.

38 Claims, 4 Drawing Sheets

U.S. PATENT DOCUMENTS

| | | | | | |
|---|---|---|---|---|---|
| 4,760,532 | A | | 7/1988 | Sansone et al. | 364/464 |
| 4,760,534 | A | | 7/1988 | Fougere et al. | 364/466 |
| 4,796,193 | A | | 1/1989 | Pitchenik | 364/464.02 |
| 4,809,185 | A | * | 2/1989 | Talmadge | 705/403 |
| 4,812,994 | A | | 3/1989 | Taylor et al. | 364/464.02 |
| 4,831,555 | A | | 5/1989 | Sansone et al. | 364/519 |
| 4,887,204 | A | * | 12/1989 | Johnson et al. | |
| 4,901,241 | A | | 2/1990 | Schneck | 364/464.02 |
| 4,949,381 | A | | 8/1990 | Pastor | 380/51 |
| 4,980,542 | A | | 12/1990 | Jackson et al. | 235/375 |
| 5,029,093 | A | | 7/1991 | Wiener | 364/464.02 |
| 5,077,792 | A | | 12/1991 | Herring | 380/24 |
| 5,181,245 | A | | 1/1993 | Jones | 380/23 |
| 5,243,654 | A | | 9/1993 | Hunter | 380/51 |
| 5,309,363 | A | * | 5/1994 | Graves et al. | 705/403 |
| 5,369,401 | A | * | 11/1994 | Haines | 705/403 |
| 5,375,172 | A | | 12/1994 | Chrosny | 364/464.02 |
| 5,480,239 | A | | 1/1996 | Kim et al. | 400/120.09 |
| 5,510,992 | A | | 4/1996 | Kara | 364/464.02 |
| 5,539,190 | A | | 7/1996 | Manduley | 235/380 |
| 5,612,884 | A | * | 3/1997 | Haines | 705/403 |
| 5,675,650 | A | * | 10/1997 | Cordery et al. | 380/23 |
| 5,758,330 | A | * | 5/1998 | Brown | 705/405 |
| 5,758,345 | A | * | 5/1998 | Wang | 707/100 |
| 5,778,066 | A | * | 7/1998 | Shah et al. | 380/24 |
| 5,822,738 | A | * | 10/1998 | Shah et al. | 705/410 |
| 5,918,234 | A | * | 6/1999 | Shah et al. | 707/204 |
| 5,974,147 | A | * | 10/1999 | Cordery et al. | 380/25 |

* cited by examiner

METHOD AND APPARATUS FOR REDUNDANT POSTAGE ACCOUNTING DATA FILES

CROSS REFERENCE TO RELATED APPLICATIONS

This application is a continuation of U.S. application Ser. No. 08/562,143, filed on Nov. 22, 1995, now issued as U.S. Pat. No. 5,918,234. The following two commonly-owned and concurrently filed applications are incorporated by reference.

C. Shah and D. T. Gilham, entitled "Method and Apparatus for Authentication of Postage Accounting Reports" application Ser. No. 08/561,662, now issued as U.S. Pat. No. 5,778,066; and C. Shah and K. Robertson, entitled "Method and Apparatus for a Modular Postage Accounting System" application Ser. No. 08/562,268, now issued as U.S. Pat. No. 5,822,738.

BACKGROUND OF THE INVENTION

The present invention relates generally to a method and apparatus for the maintenance of redundant postage accounting datafiles. More specifically, the present invention allows the maintenance of postage accounting data both in a secure metering device (SMD) and in a general purpose computer (GPC).

Historically, postage meters have been dedicated, stand-alone devices, capable only of printing postage indicia on envelopes or labels (in the case of parcels), and resided at a user's site. As such, these devices could provide postage metering only for that particular site and required the user to physically transport the device to a post office for resetting (increasing the amount of postage contained in the meter). These were secure devices which contained mechanical (later, electronic) accounting registers that dispensed postage in isolation from other systems. An advance over these systems was the ability to reset a meter via codes communicated to the user. These codes were provided by either the manufacturer or the postal authority, once the customer had made payment.

In contrast, modern electronic meters are often capable of being reset directly by an authorized party, on-site (at the user's location) via a communications link. A system which performs meter resetting in this manner is known as a Computerized Meter Resetting System (or "CMRS"). The party having authority to reset the meter and charge the customer (usually the manufacturer or the postal authority) thus gains access to, and resets the meter.

Mail accounting data may be accumulated and read from the more sophisticated electronic meters which have recently become available. Such meters can record expenditure information automatically and can issue periodic accounting reports of postage purchased. These reports may even provide detailed accounting of postage expenditures (for example, reports of postage expended by different departments in a company).

However, problems exist even in the most modern postage systems. Large users, who may maintain a number of postage meters at varied locations (often far distant from one another) cannot obtain a single consolidated report from current systems without manually compiling data from individual postage meters and databases. Further, a user whose postage meter data is corrupted or destroyed may be unable to reconstruct the lost postage accounting data.

SUMMARY OF THE INVENTION

The present invention provides an apparatus and method for the maintenance of redundant postage accounting datafiles. Redundant postage accounting report data is maintained by the present invention by first creating a datafile on a postage metering device (e.g., an SMD) to store postage accounting data. A second datafile is created on a computer capable of communicating with the SMD (which may be either remote or local to the computer). For every transaction which updates the postage accounting data stored in the SMD, the datafile residing on the computer is updated to reflect the change.

In a postage accounting report generation system of the present invention, a postage transaction is recorded in a datafile residing in a postage metering device (such as an SMD) and in a second datafile residing in a computer. The present invention can thus support departmentalized accounting and centralization of remote postage accounting.

A further understanding of the nature and advantages of the present invention may be realized by reference to the remaining portions of the specification and the drawings.

DESCRIPTION OF THE PREFERRED EMBODIMENT

I. Introduction

In the near future, systems will allow the use of existing general purpose computing resources to provide postage delivery at a user's site, allowing efficient, economical printing of postage indicia. Such systems will furnish postage at a user's location upon request, and are exemplified by the system described in the copending application entitled "Method and Apparatus for a Modular Postage Accounting System," by C. Shah and K. Robertson (filed concurrently with this application), the disclosure of which has already been incorporated herein by reference. Using well known techniques for the encryption of data within what are known as "trusted systems," such postage delivery systems use ordinary computers and printers to print encrypted postage indicia while maintaining and updating postage accounting data within the GPC's memory. By isolating the three basic postage registers within a separate device (the SMD), all functions other than overall postage accounting can then be performed in a GPC. Security of SMD register data and validation of postage printing transactions will depend on standard encryption techniques and physical security.

II. An Example of Postage Metering Using an Open System

Figure 1:
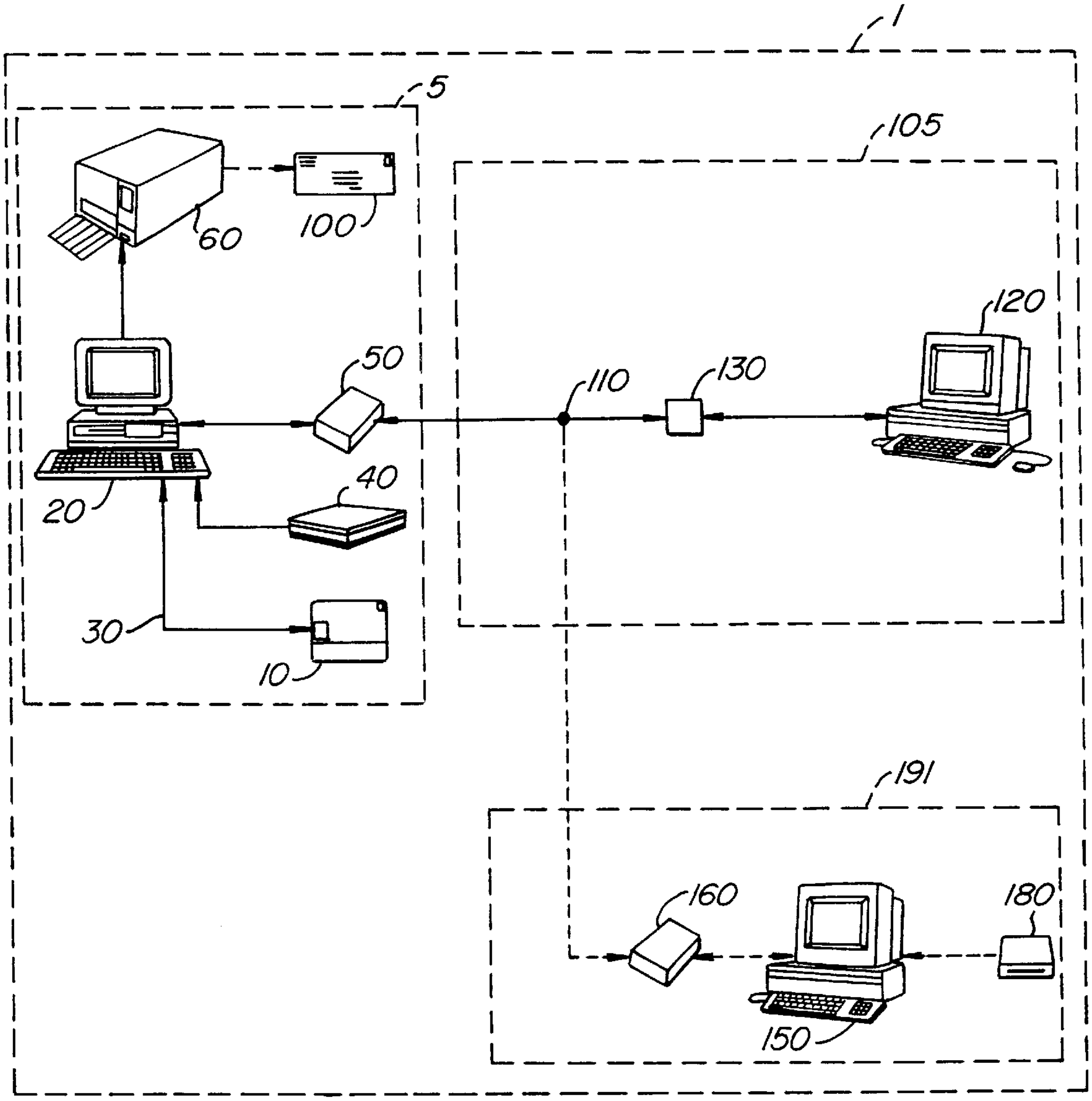
FIG. 1 is a diagram showing an example of a modular postage accounting system.

FIG. 1 is a diagram showing an example of a Modular Postage Accounting System (MPAS) 1. MPAS 1 consists of three major components: a CMRS 105, a ZIP-code information system (ZCIS) 191 and an open system metering device (OSMD) 5. The first component, CMRS 105, is a system based on modem communications between a modern electronic postage meter (not shown) and a resetting station computer 120. Well known in the art, the operation of CMRS 105 is the subject of government standards. The operation of CMRS 105 will therefore not be treated in detail here. The second component, ZCIS 191, provides computer access to national and international ZIP-codes. ZCIS 191 is a commercially-available system, with some 150 installations in the U.S. As such, its operation, too, will not be treated in detail. The final component, OSMD 5, performs all of the functions traditionally associated with conventional postage meters and may include a secure metering device (SMD) 10, a GPC 20, an electronic scale 40 and a digital printer 60. SMD 10 performs the accounting functions generally associated with the traditional postage meter. SMD 10 generates encrypted postage indicia for transmission by the computer to digital printer 60 and subsequent printing on a mailpiece (exemplified by a mailpiece 100).

A secure communications link 30 connects SMD 10 to GPC 20. Secure communications link 30 may be any mechanism of transferring information such that it is protected from unauthorized interception, such as an RS-232C serial communications line or a direct internal connection to GPC 20. These techniques may be combined with encryption of the postage information. SMD 10 contains two battery augmented memories (BAMs, not shown) for providing non-volatile storage of postage accounting information. This postage information, as is well known in the art, typically consists of an ascending register, a descending register and a control total register (none of which are shown). As is also well-known in the art, an ascending register holds a value equal to the amount of postage used, a descending register holds a value equal to the amount of postage which remains unused, and a control total register holds the sum of the ascending register and descending register. SMD 10 may also contain a real-time clock and memory (neither of which is shown). Encryption may be performed by a hardware encryptor or by software algorithm (for instance, the DES or RSA algorithms). SMD 10 may contain postage accounting information for one or more departments within a customer's organization, which may be widely dispersed geographically.

GPC 20 is also connected to a communications interface device 50, which provides access to a CMRS 105 via a communications medium 110. A communications device 130 allows a resetting station computer 120 to communicate with GPC 20 and SMD 10 to perform resets (add postage value to SMD 10), accounting/auditing operations and other functions as required. Optionally, GPC 20 and SMD 10 may communicate with a ZCIS computer 150. ZCIS computer 150 is connected to communications medium 110 via a communications interface device 160. Also connected to ZCIS computer 150 is a CD-ROM device 180, which holds national and international postal ZIP-code information.

As is well known in the art, a system such as this requires operating software (not shown). Software resident on GPC 20 enables GPC 20 to communicate with CMRS 105, SMD 10, digital printer 60 and, optionally, electronic scale 40. Software with these capabilities is commercially available, and so will not be described in detail herein. The protocol used by CMRS 105 (which supports communication between SMD 10, GPC 20 and CMRS 105) is also well-known, as it is the subject of a U.S. government standard. Software resident on SMD 10 is also well-known and is similar to that disclosed in U.S. Pat. No. 4,484,307, by Quatse et al, the disclosure of which is incorporated herein by reference.

Communication between GPC 20 and SMD 10 is bi-directional. GPC 20 sends control commands and information requests to SMD 10. SMD 10, in return, may send human-readable data (in response to information requests), postage indicia (in response to postage requests and which are encrypted) or both. For example, postage is requested by a user (not shown) by the user's entering postage information into GPC 20. GPC 20 sends this information, together with mail class/service, any other values required (e.g., insurance) and the destination ZIP-code to SMD 10.

In turn, SMD 10 responds by generating a secure (via encryption) postage indicia file together with a license number and transmitting that information to GPC 20. GPC 20 takes the information provided by SMD 10 and constructs a postage indicia print file comprising a two-dimensional code, graphical information and human-readable data. The postage indicia print file, together with optional information (such as address information, ZIP-code barcoding and any user-defined information) is transmitted to printer 60 for printing. Printer 60 then imprints the postage indicia and other information onto an envelope (mailpiece 100), a label (not shown) or other means of affixation of postage. GPC 20 may also access CMRS 105 for resetting SMD 10, auditing by postal authorities and other purposes. This allows for resetting (the entry of postage credit) in a manner similar to conventional electronic postage meters.

Alternately, SMD 10 may reside at the CMRS site and communicate with resetting station computer 120 via a secure communications link (not shown). In this configuration, GPC 20 and resetting station computer 120 communicate over communications medium 110 on a transactional basis. When postage is desired, GPC 20 communicates the request to resetting station computer 120, which in turn sends the request to SMD 10. SMD 10 then returns a postage indicia file, which is communicated to GPC 20 for printing. As the per transaction overhead is higher for this configuration, requests may be submitted together to reduce overhead.

III. The Maintenance of Redundant Postage Accounting Datafiles

The present invention uses the previously described interface between SMD 10 and a computer (either GPC 20 or resetting station computer 120) to maintain postage accounting information, which may subsequently be used to create reports. A record of each transaction, running totals or both are maintained in GPC 20, resetting station computer 120 or both, by comparing stored accounting information to the running totals residing in SMD 10. Postage accounting reports may then be accessed by authorized parties, such as the user's accounting department, the manufacturer or the postal authority.

Figure 2:
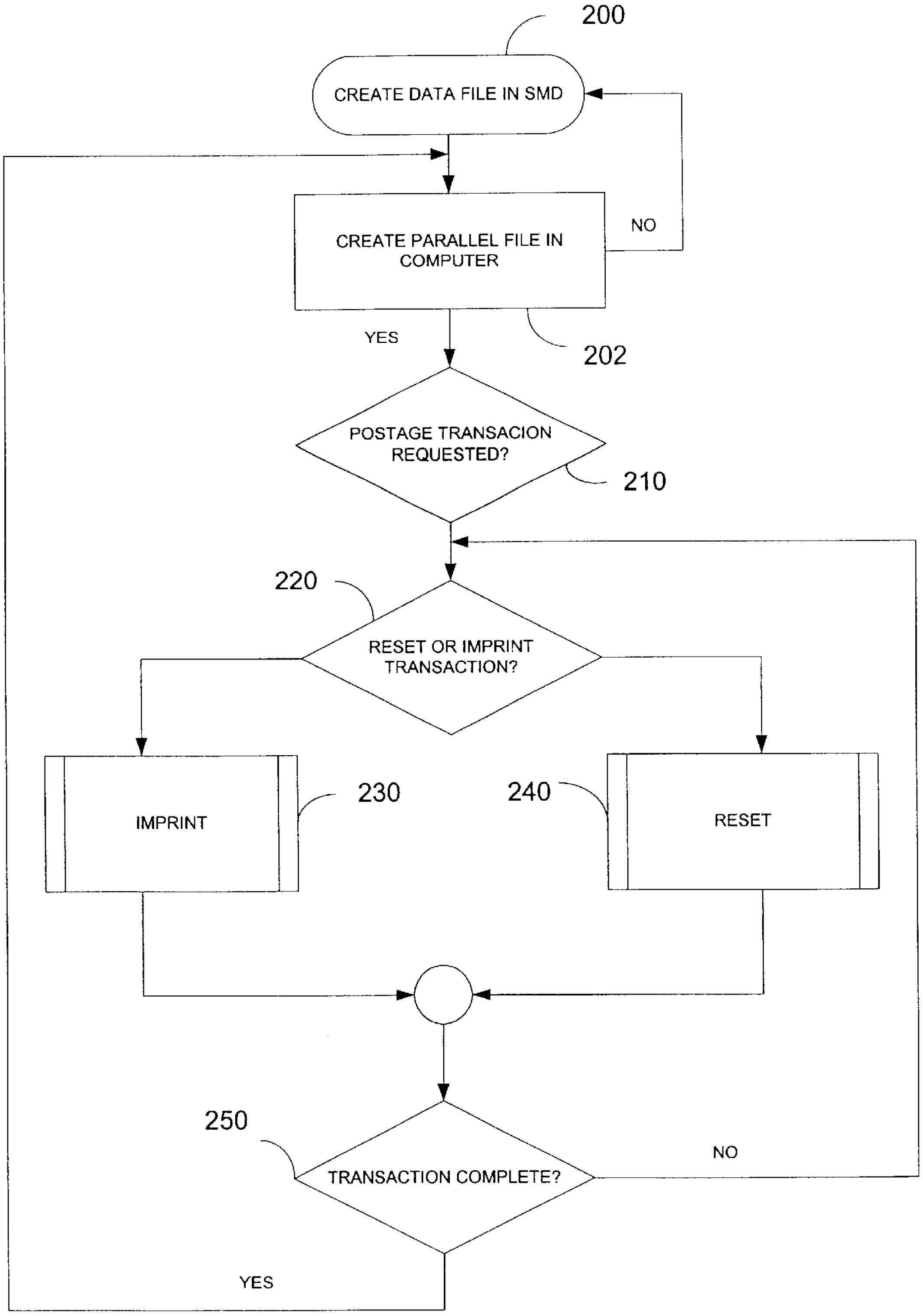
FIG. 2 is a flowchart showing a specific embodiment of the present invention, specifically the maintenance of redundant postage accounting datafiles.

Record keeping in the MPAS is shown in FIG. 2 and typically proceeds as follows. First, datafiles are created in SMD 10 and either GPC 20, resetting station computer 120 or both (depending on the user's needs). This creates redundant postage accounting datafiles, as shown in steps 200 and 202 of FIG. 2. At step 210, the user makes a transaction request. When a transaction is requested, a decision is made at step 220 as to whether the user has requested an imprint transaction or reset transaction. Other transactions may occur at this point, but are not shown for the sake of clarity. Copending application entitled "Method and Apparatus for a Modular Postage Accounting System," by C. Shah and K. Robertson, should be referenced for a more complete listing of these communications.

Figure 3:
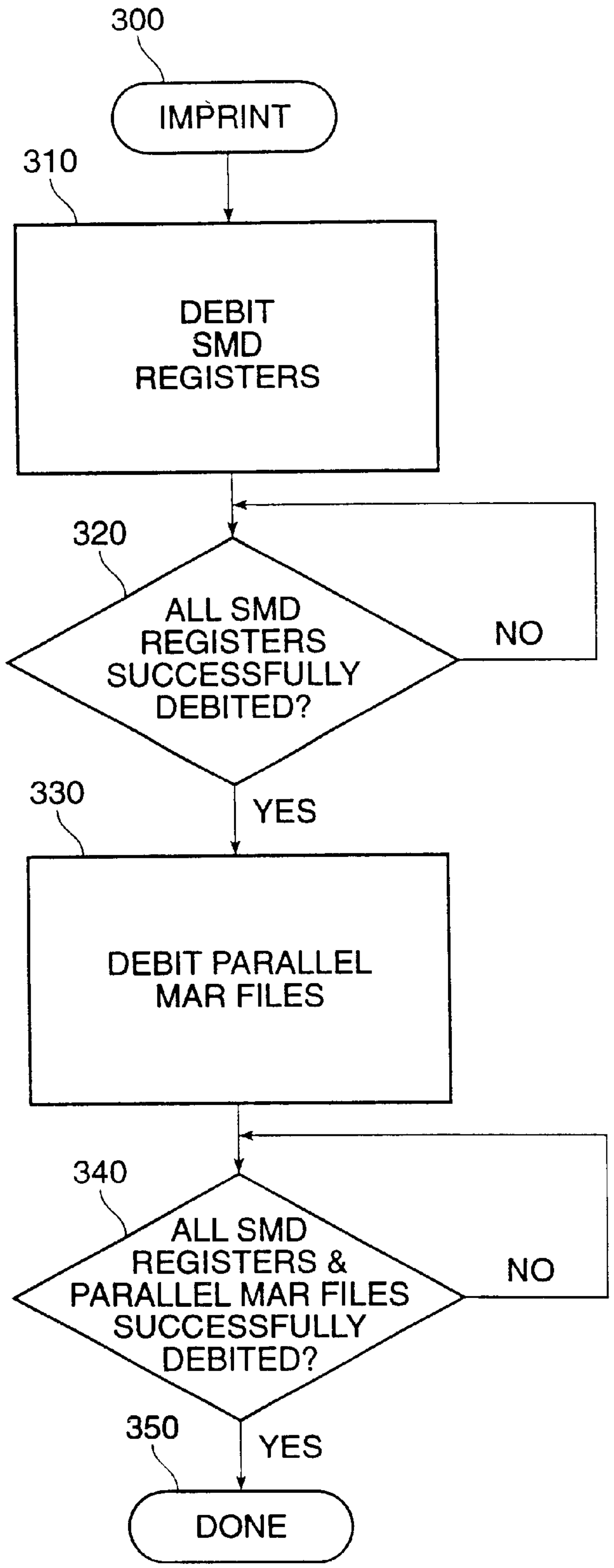
FIG. 3 is a flowchart showing a specific embodiment of the present invention, specifically the actions which occur upon the imprinting of postage.

If the user selects an imprint transaction, the system performs imprint processing (step 230). As shown in FIG. 3, imprint processing begins (step 300) by debiting the postage amount from the credit stored in the BAMs (step 310) and then checks to ensure that the data was successfully entered (step 320). At step 330, redundant postage accounting datafiles are updated by debiting the proper accounts. These datafiles contain the Mail Accounting Report (MAR) data, which details postage use by department. Again, the datafiles are checked to ensure that the data was successfully entered (step 340). In step 350, imprint processing then concludes.

Figure 4:
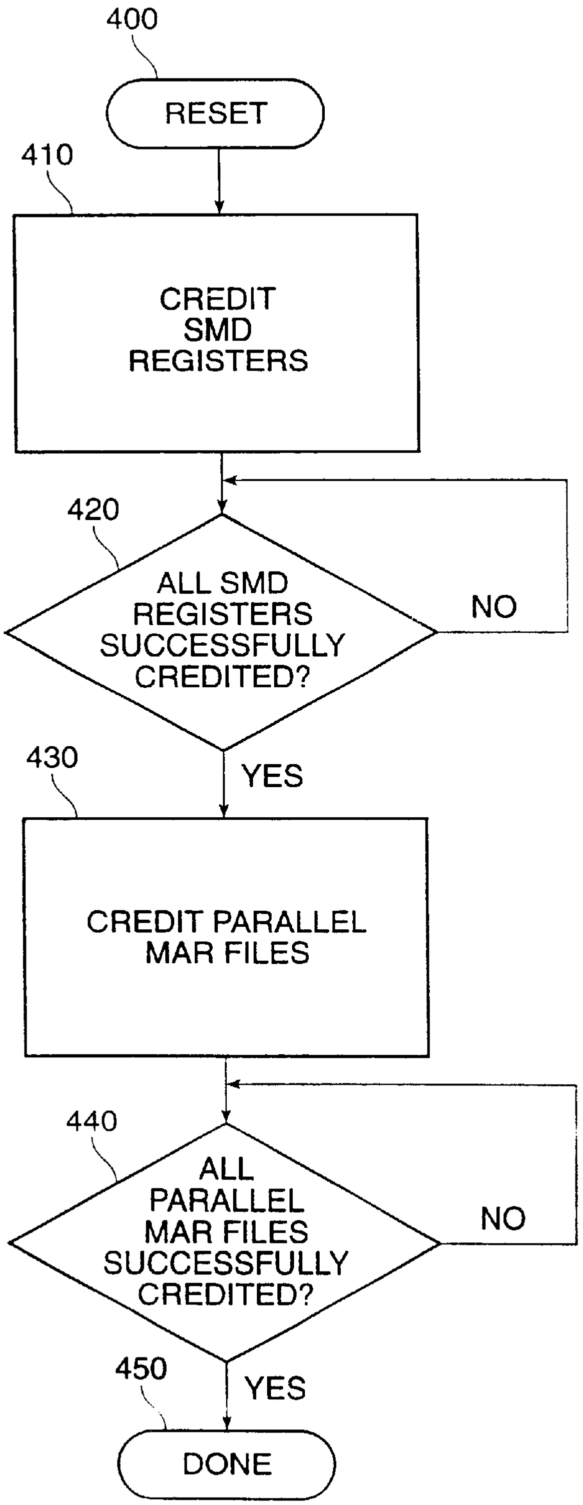
FIG. 4 is a flowchart showing a specific embodiment of the present invention, specifically the resetting of postage values.

If the user selects a reset transaction, the system performs reset processing (step 240). As shown in FIG. 4, reset processing begins (step 400) by crediting (or "resetting") SMD 10. Crediting is done by increasing the postage amount held in the BAMs by the amount of postage purchased (step 410). At step 420, the values are checked to ensure that data entry was successful. At step 430, redundant postage accounting datafiles are updated by crediting the proper accounts. These datafiles contain the Postage Reset Payment Record (PRRR) data, which maintains a history of the postage resets which have been performed. Again, the datafiles are checked to ensure that the data was successfully entered (step 440). In step 450, reset processing then concludes. If no further transactions are pending, the system goes back to its ground state, as reflected by step 250 in FIG. 2.

The present invention thus allows automatic maintenance of postage accounting report data. This data may reside on GPC 20, resetting station computer 120 or both. This makes six scenarios possible: SMD 10 and redundant postage accounting datafiles on the same computer (either GPC 20 or resetting station computer 120), SMD 10 and redundant postage accounting datafiles on different computers, or redundant postage accounting datafiles on both computers (with the SMD on either GPC 20 or resetting station computer 120). Maintaining the postage accounting report data on resetting station computer 120 is the most likely scenario because there is less opportunity for tampering, as access may be easily controlled and users are restricted to read-only access (and then, they may only access their own datafiles). For large users, SMD 10 will also be likely to reside on resetting station computer 120. The advantage of this approach is that large users, who may maintain a number of postage meters at varied locations, have the option of obtaining a single consolidated report from the central computer data, and destroyed or corrupted postage accounting report data can be retrieved from equally reliable data residing on resetting station computer 120. Just as with a CMRS postage meter, postage reset transactions are controlled by resetting station computer 120 located at the meter company's central office, which is interfaced to GPC 20 via modem and telephone line. Thus, the existing link between GPC 20 and resetting station computer 120 may be exploited to provide an alternate source for accounting data.

Of course, redundant postage accounting datafiles may be kept on both GPC 20 and resetting station computer 120 to provide maximum redundancy. However, this configuration also entails the greatest per-transaction overhead, with communication and updating required for each transaction. The choice of configuration will thus rest on customer requirements, as some configurations entail these communications anyway.

While the above is a complete description of specific embodiments of the invention, various modifications, alternative constructions, and equivalents may be used. For example, the redundant postage accounting datafiles and SMD 20 may be situated in several locations. Also, multiple transactions may be submitted together to improve efficiency. Therefore, the above description should not be taken as limiting the scope of the invention as defined by the claims.

What is claimed is:

1. A method of maintaining redundant postage accounting data comprising:

creating a first datafile in a non-volatile memory of a postage metering device for storing postage accounting data;

creating a second datafile in a non-volatile memory of a computer and outside said postage metering device, wherein said computer is operatively coupled to said postal metering device and said second datafile is a redundant datafile for said postage accounting data; and updating said second datafile to reflect changes in said first datafile.

2. The method of claim 1, wherein said second datafile allows user read-only access.

3. The method of claim 1, further comprising:

generating a consolidated report pertaining to activities within a plurality of postage metering devices based on one or more second datafiles associated with said plurality of postage metering devices.

4. The method of claim 3, wherein said consolidated report includes postage usage information related to imprint transactions.

5. The method of claim 3, wherein said consolidated report includes postage reset information related to reset transactions.

6. The method of claim 1, further comprising:

updating said first datafile in response to a postal transaction.

7. The method of claim 6, wherein said postal transaction is an indicium imprint transaction or a meter reset transaction.

8. The method of claim 6, wherein said updating said first datafile is performed via a secure transaction.

9. The method of claim 8, wherein said secure transaction is achieved via encryption.

10. The method of claim 1, wherein communication between said postage metering device and said computer is achieved via a secure communications link.

11. The method of claim 1, wherein said updating said second datafile is performed after each postal transaction in which said postage accounting data in said first datafile is updated.

12. The method of claim 1, wherein said first datafile is inaccessible via said computer.

13. The method of claim 1, wherein said postage accounting data comprises a descending register indicative of an amount of available funds.

14. The method of claim 1, wherein said postage metering device is located within an enclosure of said computer.

15. The method of claim 1, wherein said computer is located remotely from said postage metering device.

16. The method of claim 1, wherein said second datafile is secure.

17. The method of claim 1, wherein said postage metering device is communicatively coupled to a plurality of computers.

18. The method of claim 1, wherein said second datafile includes a history of transactions carried out by said postage metering device.

19. The method of claim 1, wherein said first datafile is stored in dual redundant memory devices within an enclosure of said postage metering device.

20. A postage accounting report generation system wherein a postage transaction is recorded in a first datafile in a non-volatile memory residing in a postage metering device and a second datafile in a non-volatile memory residing in a computer and outside said postage metering device, said computer coupled to said postage metering device, for the purpose of maintaining a redundant datafile.

21. The system of claim 20, wherein user access to said second datafile is read-only.

22. The system of claim 20, wherein a consolidated report pertaining to activities within a plurality of postage metering devices is generated based on one or more second datafiles associated with said plurality of postage metering devices.

23. The system of claim 22, wherein said consolidated report includes postage usage information related to imprint transactions.

24. The system of claim 22, wherein said consolidated report includes postage reset information related to reset transactions.

25. The system of claim 20, wherein said first datafile is updated in response to a postal transaction.

26. The system of claim 25, wherein said postal transaction is an indicium imprint transaction or a meter reset transaction.

27. The system of claim 25, wherein said first datafile is updated via a secure transaction.

28. The system of claim 27, wherein said secure transaction is achieved via encryption.

29. The system of claim 20, wherein communication between said postage metering device and said computer is achieved via a secure communications link.

30. The system of claim 20, wherein said second datafile is updated after each postal transaction in which said postage accounting data in said first datafile is updated.

31. The system of claim 20, wherein said first datafile is inaccessible via said computer.

32. The system of claim 20, wherein said postage accounting data comprises a descending register indicative of an amount of available funds.

33. A method f maintaining redundant postage accounting data comprising:

creating a first datafile on a postage metering device for storing postage accounting data, said first datafile being used to keep accounting of the usage of said postage metering device by a user;

creating a second datafile on a computer and outside said postage metering device, wherein said computer is operatively coupled to said postal metering device and said second datafile is a redundant datafile for said postage accounting data, wherein said user is provided read-only access to said second datafile, so that said user may obtain information on said postage accounting data;

updating said first datafile in response to a postal transaction; and updating said second datafile to reflect changes in said first datafile, wherein said first datafile is inaccessible via said computer.

34. A method of maintaining redundant postage accounting data on a user's use of a postage metering device, comprising:

creating a first datafile in a first non-volatile memory of said postage metering device to store postage accounting data;

creating a second datafile in a second non-volatile memory of a computer and outside said postage metering device to store redundant postage accounting data; and creating a transaction file in said computer, said transaction file containing postal transaction records to allow said user to view or print said postal transaction records.

35. The method of claim 34, further comprising:

updating said first datafile and second datafile in response to a postal transaction.

36. The method of claim 35, wherein said first datafile maintains only updated postage accounting data.

37. The method of claim 34, wherein said first datafile is used to charge said user for the postage metering device use according to said postage accounting data stored in said first datafile.

38. A method of maintaining redundant postage accounting data on a user's use of a postage metering device, comprising:

creating a first datafile in a first non-volatile memory of said postage metering device to store postage accounting data; and creating a second datafile in a second non-volatile memory of a computer and outside said postage metering device to store redundant postage accounting data and a postal transaction log providing transaction history.

* * * * *